United States Patent
Cherubim

[11] 3,809,443
[45] May 7, 1974

[54] HYDRODYNAMIC FOIL BEARINGS
[75] Inventor: Justin Lawrence Cherubim, Flint, Mich.
[73] Assignee: Mechanical Technology Incorporated, Latham, N.Y.
[22] Filed: Aug. 5, 1971
[21] Appl. No.: 169,372

[52] U.S. Cl. .................................................. 308/9
[51] Int. Cl. .......................................... F16c 17/16
[58] Field of Search ................. 308/160, 121, 9, 73

[56] References Cited
UNITED STATES PATENTS
3,635,534  1/1972  Barnett .............................. 308/121
2,306,048  12/1942  Fast ...................................... 308/73
3,382,014  5/1968  Marley................................ 308/160

Primary Examiner—Charles J. Myhre
Assistant Examiner—Frank Susko
Attorney, Agent, or Firm—Joseph V. Claeys; Charles W. Helzer

[57] ABSTRACT

A resilient hydrodynamic bearing wherein a resilient bearing insert made up of two separate bearing element members arranged in laminate relationship and anchored together to allow a limited amount of relative movement therebetween is disposed within the spacing defined by the confronting surfaces of the opening in a supporting structure and a shaft or other movable member received within the opening and anchored to the supporting structure to allow for a limited amount of relative movement and operative under dynamic conditions to establish a hydrodynamic fluid film support for the movable member. One bearing element member is disposed adjacent the movable member and presents a surface area thereto and the other bearing element member includes a plurality of spaced-apart resilient surface elevations formed therein which under dynamic conditions are operative to frictionally contact and resiliently support the said one bearing element member and cause it to deflect between adjacent resilient surface elevations to create the load supporting hydrodynamic fluid film.

23 Claims, 10 Drawing Figures

JUSTIN L. CHERUBIM
INVENTOR

HYDRODYNAMIC FOIL BEARINGS

This invention relates generally to fluid film bearings and more particularly to improved hydrodynamic bearings of the type including a resilient load supporting bearing insert means. While the fluid film bearings of this invention may be operated with any suitable lubricant including multiphase, mixed and process fluids, they are particularly advantageous as gas lubricated and steam lubricated bearings and will be described in detail in that connection. Moreover, the bearings of this invention, although illustrated and described in connection with rotational bearings such as those of the journal and thrust type, are equally adaptable and advantageous for use with elements undergoing relative linear motion.

Hydrodynamic bearings are known which employ either resiliently compliant foil supports which extend circumferentially about only a portion of the shaft, or a plurality of separate foils connected together in overlapping shingle-type relation to form a resilient unitary assembly about the shaft; the bearing foils compliantly supporting the shaft by virtue of their inherent spring stiffness.

While the foregoing bearings are generally satisfactory for many applications, there is need to provide improvements in resilient hydrodynamic bearings as well as to reduce manufacturing and assembly costs. The resilient hydrodynamic bearings of this invention are less complex in construction and less expensive to manufacture than known prior art bearings of this type while at the same time providing improved results.

Accordingly, it is an object of this invention to provide a new and improved hydrodynamic bearing which is of inexpensive construction and capable of operating at high rotating velocities.

It is another object of this invention to provide a new and improved fluid film lubricated hydrodynamic bearing which possesses increased viscous and Coulomb damping.

It is yet another object of this invention to provide a new and improved hydrodynamic bearing in which the bearing stiffness and the lubricant film thickness can be independently controlled.

It is still another object of this invention to provide a new and improved bearing which is capable of operation with all suitable lubricants including gaseous, liquid, multiphase and process fluids and mixtures thereof.

It is a further object of this invention to provide a new and improved hydrodynamic bearing which does not require high machining accuracy, is simple to manufacture and assemble and can be produced at low cost.

It is yet a further object of this invention to provide a new and improved hydrodynamic bearing which does not require precise alignment or maintenance of dimensions during operation.

Briefly stated, in accordance with one aspect of this invention, a new and improved hydrodynamic bearing comprises a resilient bearing insert assembly adapted to fit within a supporting structure to support radial and-/or axial loads on a movable member, such as a shaft. The bearing insert structure includes first and second bearing element members at least one of which exhibits a plurality of resilient surface elevations of a predetermined configuration and pattern which contact and support the other bearing element member during operation and cause deflection of such other bearing element member between adjacent surface elevations and the creation of hydrodynamic load supporting films. The relationship between the two bearing element members and the stiffness of the resilient surface elevations and of the other bearing element member with which it coacts should be such that sufficient deflection takes place between the adjacent resilient surface elevations to cause creation of a load supporting hydrodynamic fluid film.

Preferably, the shapes and dimensions of the two bearing element members and of the resilient surface elevations are selected to provide stiffnesses such that during bearing operation under maximum steady-state design speed and loading, the stiffness of the resilient surface elevations of the one bearing element member is less than twice the stiffness of the lubricant film in the region of smallest clearance between confronting bearing surfaces and the stiffness of the other bearing element member is such that the ratio of the maximum elastic deflection of such other bearing element member in the direction normal to the confronting bearing surface in the region between adjacent surface elevations to the smallest clearance is at least about 0.5.

The term "bearing element member" as used herein means a thin flexible film lubricated web or strip of metal or other suitable material whose thickness relative to its other dimensions is such that it will be deflected by the hydrodynamic film forces created during bearing operation. Examples of suitable bearing elements are thin flexible spring webs or strips of steel, suitable polymeric materials such as polytetrafluoroethylene, or of other materials which will function in the particular operating environment to cause the creation of a load-supporting hydrodynamic fluid film.

The novel features believed characteristic of this invention are set forth with particularity in the appended claims. The invention itself, however, both as to its organization and method of operation together with further objects and advantages thereof may best be understood by reference to the following description taken in conjunction with the accompanying drawings, and in which:

Figure 1:
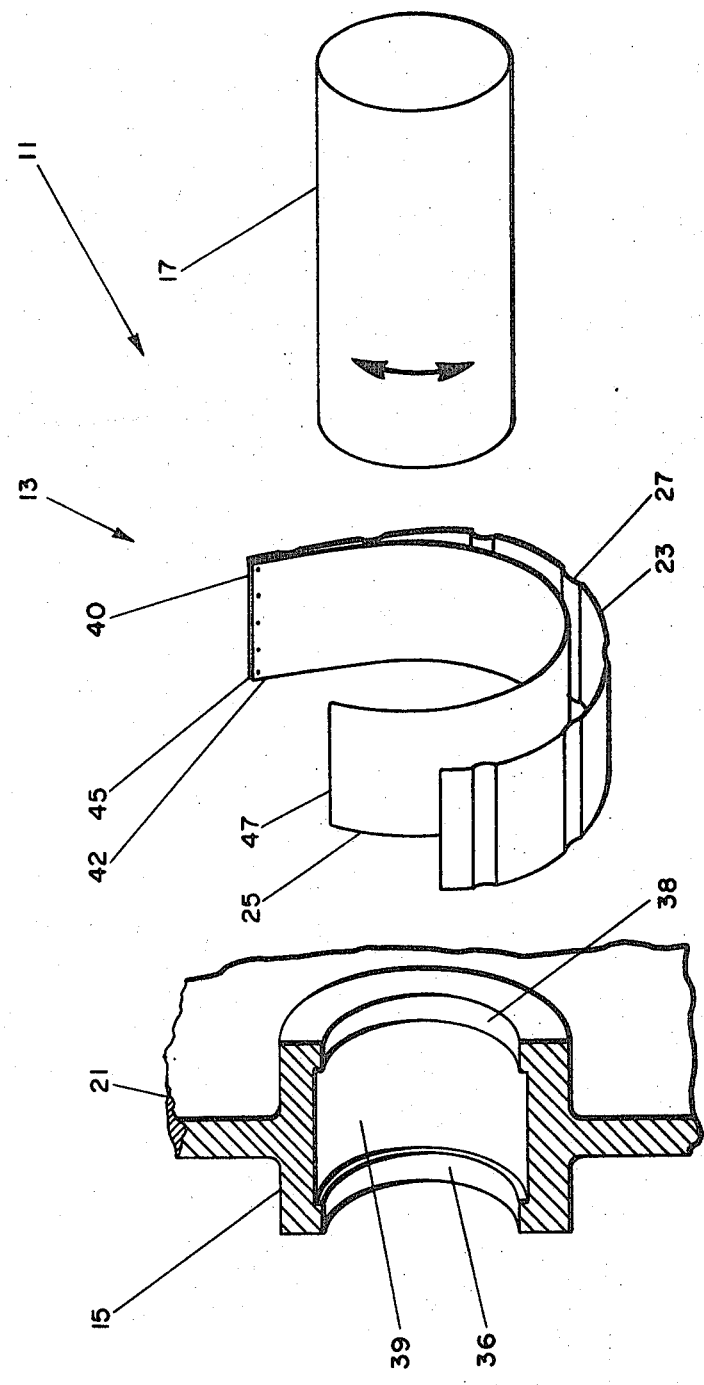
FIG. 1 is a diagrammatic exploded partial section view of one embodiment of a hydrodynamic bearing of this invention.

Referring now to FIG. 1, there is shown one embodiment of a new and improved universal hydrodynamic bearing in accordance with this invention. The bearing, generally designated as 11, is shown in exploded view, in horizontal disposition, and comprises a resilient bearing insert assembly 13 adapted to fit within a supporting structure 15, which may be a bearing housing, to support the load on a movable member, shown as a shaft 17 which, as indicated by the arrow, may rotate in either direction. The housing 15 may be part of a larger structure, such as for example an engine casing 21.

In accord with this invention, the resilient bearing insert assembly 13 comprises the combination of a first bearing element member 23 and a second bearing element member 25 disposed in top-to-bottom juxtaposition so as to be in coacting relationship with each other. Bearing element member 23 is provided with a plurality of spaced-apart resilient surface elevations 27 of a suitable configuration and pattern which are adapted to contact and support the second bearing element member 25 during bearing operation and cause deflection of bearing element member 25 between adjacent resilient surface elevations and create hydrodynamic load supporting films. The stiffness of bearing element member 25 must be such that sufficient deflection occurs to cause a load supporting hydrodynamic fluid film to be created.

As shown in FIG. 1, the resilient surface elevations may be provided as a plurality of transverse resilient surface elevations 27 spaced-apart longitudinally of the member 23. The resilient surface elevations 27 may be formed in member 23 in any suitable manner, such as by rolling or any other suitable manufacturing process. The surface of member 25 may be smooth or may also be provided with resilient elevations of a suitable configuration and pattern. The arrangement of the two bearing element members 23 and 25 is such that during bearing operation there is an interaction between them which under the influence of the hydrodynamic film forces causes the member 25 to be supported by the resilient elevations 27 and to be locally deflected between adjacent surface elevations 27 a sufficient amount to create load supporting fluid films.

Figure 2:
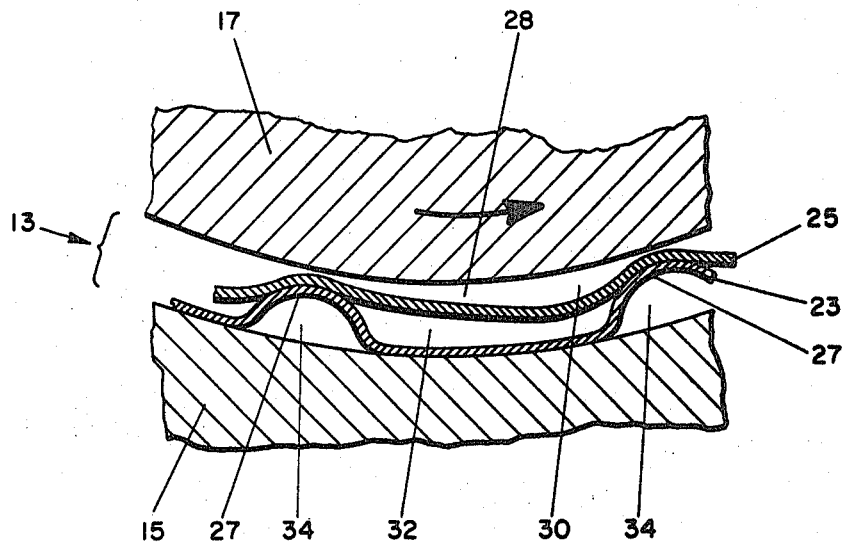
FIG. 2 is a diagrammatic section view of a portion of the resilient bearing insert assembly of this invention showing the interaction of the first and second bearing element members to form a bearing profile.

The operation of the bearing of this invention and the coaction of the bearing element members 23 and 25 is best understood by reference to FIG. 2 which shows a portion of the resilient bearing insert assembly 13 greatly enlarged. As shown, the dynamic interaction between bearing element members 23 and 25 under the influence of the hydrodynamic film forces causes the member 25 to be locally deflected between adjacent resilient surface elevations 27. The resulting profile of the deflection of member 25 is determined by the combination of the geometry of the resilient surface elevations 27, the pressure distribution in the lubricant film 28 and the stiffness of the bearing element members. The converging zones 30 of the fluid lubricant film create relatively higher pressure areas and support the rotating shaft 17 much in the manner of the fluid lubricant wedges formed under tilting pad bearings. While in this illustration the member 25 is shown to be free hanging between the resilient surface elevations of member 23, contact between members 23 and 25 between elevations 27 may occur.

The shaft is thus rotatably supported by the hydrodynamic fluid films created by the interaction of bearing element members 23 and 25 of the resilient bearing insert assembly 13. This interaction between the members 23 and 25 and the hydrodynamic film forces is particularly important in providing unique cushioning and damping to imposed fluctuating loads. Such load fluctuations may be caused, for example, by orbital excursions of the shaft within the limiting confines of the bore. The energy of the shaft excursions is dissipated by a combination of viscous damping in the lubricant film and by Coulomb friction between the bearing element members. Additionally, members 23 and 25 interact with the partially trapped lubricant in the space 32 to provide the additional viscous damping function of tuned dashpots. A similar damping function is performed by the trapped lubricant in space 34 under the resilient surface elevations 27. Consequently, sub-frequency or whirl instability of the shaft is eliminated or, at least greatly reduced. One particular bearing, constructed in accordance with this invention, was operated for several hours at speeds of over 100,000 rpm without any evidence of such sub-frequency or whirl phenomena.

In a preferred embodiment of the invention, the resilient surface elevations of the one member (23) exhibit a stiffness, during bearing operation at maximum steady-state design speed and loading, which is less than twice the stiffness of the lubricant film in the region of smallest clearance between confronting bearing surfaces. Further, the stiffness of the other member (25), which coacts with the one member (23), is such that the ratio of the maximum elastic deformation of such other member (25) between adjacent resilient surface elevations, in the direction normal to the confronting bearing surfaces, to the smallest clearance between confronting bearing surfaces is at least about 0.5.

The rotation of the shaft 17 within the bore defined by the member 25 and the resulting hydrodynamic fluid film forces causes local deflection of the member 25 between adjacent resilient surface elevations 27 and the creation of load supporting hydrodynamic lubricant films. Accordingly, the thickness and/or stiffness of the material of bearing element member 25 must be sufficient to give such member adequate resiliency to allow for the required deflection between adjacent surface elevations of member 23, but not so great as to give the members a rigid body reaction. That is, the thickness of members 23 and 25 relative to their other dimensions is such that member 25 will be locally deflected between adjacent resilient surface elevations of its co-acting member 23 under the influence of the hydrodynamic film forces.

Conveniently, the shape profiles of the resilient surface elevations 27 may be in the form of displaced cosine curves or circular arcs and may be either formed from the bearing element member itself or, if more desirable for certain applications, built up on the surface of the web by disposing thereon suitable members of metal, elastomer, polymer or the like. The vertical height of the undistorted resilient surface elevations may be conveniently chosen to be larger than the ratio of the maximum load on such surface elevations to the stiffness of such elevations.

Consistent with the foregoing, the thickness and/or stiffness of the bearing element members 23 and 25, the shape and vertical height of the resilient surface elevations 27, and the spacing between adjacent surface elevations are otherwise determined in accordance with the basic criteria of stiffness of shapes as described by the bearing requirements. For example, bearing element members having a thickness in the range of about 0.001 to 0.005 inches are suitable for many applications. Also, in some particular bearings employing bearing element members of tempered steel having a thickness in the range of about 0.001 to 0.005 inches, vertical heights of the resilient surface elevations in the range of about 0.001 to 0.030 inches were found to be entirely satisfactory. As previously stated, bearing element members 23 and 25 may be formed of any suitable material such as, for example, suitably tempered SAE 1030 or 1040 spring steel. For higher temperature applications, members 23 and 25 may be formed from Tungsten, Tantalum, Molybdenum or any other suitable high temperature materials. Also, if desired, bearing element member 25 may be provided with a coating, or layer, of a low friction material, such as for example polytetrafluoroethylene or molybdenum disulfide. While to some extent the bearing application requirements and operating environment will determine the suitability of a given material, such materials should generally have suitable properties of elasticity, stiffness, fretting resistance, thermal conductivity and stability.

The resilient bearing insert assembly 13 exerts a small static preload on the shaft which tends to cause relative movement between the members 23 and 25, as well as, relative movement between the insert assembly and the supporting structure. Since the members 23 and 25 should ordinarily not be allowed to move continuously with respect to each other or to the supporting structure, it is desirable that means be provided to limit the amount of relative movement.

Accordingly, axial movement of the bearing insert assembly 13 may be conveniently limited by providing the bore 29 of the supporting structure 15 with suitable shoulders 36 and 38 as shown in FIG. 1. Also, rotational movement may be prevented by spot welding, or otherwise suitably securing the web member 23 to the surface of the bore 39; relative movement between the two bearing element members 23 and 25 being limited by a suitable connection or restraining means.

To this end, the members 23 and 25 may be suitably arranged to form a unitary assembly. Since some amount of relative movement should ordinarily be allowed to take place between members 23 and 25 during bearing operation to accommodate deformation under load, thermal expansion and the like, any connection between members 23 and 25 should limit rather than prevent such movement. For example, members 23 and 25 may be conveniently arranged into a unitary assembly to restrict their relative movement, by connecting them together at only one location. Such a connection may be made in any suitable manner, such as by spot welding, near one end as shown in FIG. 1. Thus, the end 40 of member 23 may be rigidly connected with the end 42 of member 25. Also, to allow for circumferential expansion the insert assembly 13 may be suitably dimensioned to provide for a small gap between its ends when the assembly 13 is mounted within the bore 39 of the supporting structure. This may be provided, as shown in FIG. 1, by dimensioning the members 23 and 25 for overlapping butting relationship when disposed within the bore 39. For example, a small portion 45 of member 23 may project beyond the end of member 23 to support the free end 47 of the member 25. It should be understood that the opposed ends of the insert assembly may be arranged in any other suitable manner such as in simple butting relationship with allowance for the required gap between such opposed ends when disposed within the bore 39.

Figure 3:
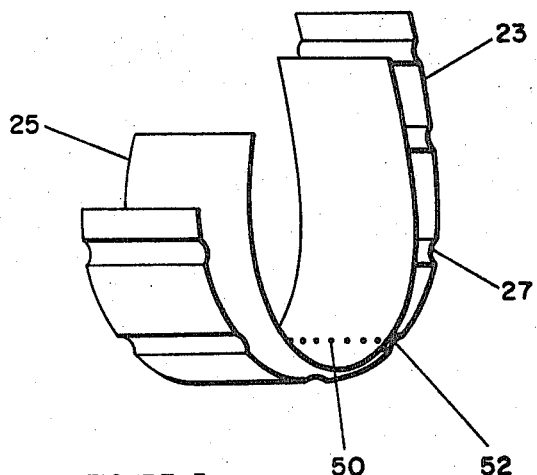
FIG. 3 is a diagrammatic view of a bearing insert assembly in accordance with another embodiment of this invention.

Alternatively, the connection may be made near the center as shown more particularly in FIG. 3. For example, members 23 and 25 may be connected near the center by suitable spot welds 50 at a confronting resilient surface elevation 52 of member 23.

Figure 4:
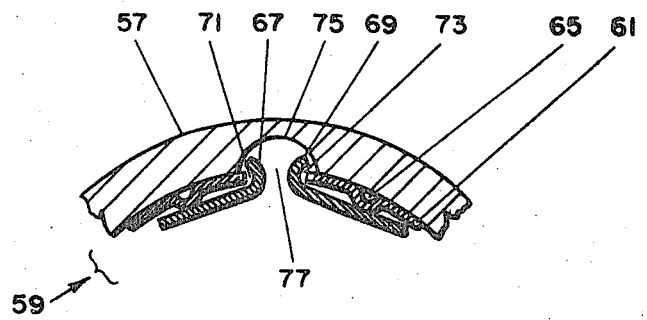
FIG. 4 is a diagrammatic section view of a portion of a hydrodynamic bearing in accord with still another embodiment of this invention showing the resilient bearing insert thereof including means to limit the amount of movement between the two interacting bearing element members as well as between the insert assembly and the supporting structure with which it is associated.
Figure 5:
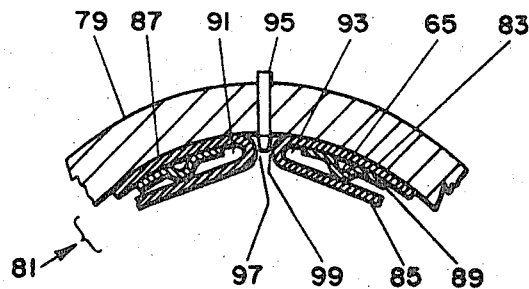
FIG. 5 is a diagrammatic section view of a portion of a hydrodynamic bearing of this invention showing another means of limiting movement of the resilient bearing insert within the supporting structure as well as limiting the amount of movement between the interacting bearing element members of such insert assembly.

Other arrangements for limiting the movement of members 23 and 25 with respect to each other and to the supporting structure are shown in FIGS. 4 and 5.

In FIG. 4 there is shown a portion of another embodiment of this invention wherein the two coacting bearing element members are arranged to form a unitary assembly which includes means for limiting movement of the two members with respect to each other as well as with respect to the supporting structure.

As shown, a resilient bearing insert assembly 59 is mounted within a supporting structure 57. The insert assembly 59 includes a first bearing element member 61 having a plurality of spaced-apart resilient surface elevations 65 and a second bearing element member 63 contiguous thereto and arranged to be supported by the resilient surface elevations 65 of the member 61. Bearing element member 63 terminates at its ends in radial, outwardly directed lip portions 67 and 69 which restrain the member 63 therebetween leaving small gaps 71 and 73 to allow for some relative movement between the members 61 and 63 to accommodate deformation under load, thermal expansion and the like. Further, a suitable slot 75 is provided in the supporting structure 57 for receiving the radial, outwardly extending lip portions 67 and 69 to restrain movement of the insert assembly 59 within the supporting structure 57.

In the foregoing described arrangement, therefore, the radial, outwardly extending lip portions 67 and 69 of bearing element member 61 cooperate with the bearing element member 63 and with the slot 75 of the supporting structure 57 to limit the amount of relative movement between the two bearing element members as well as the amount of relative movement between the assembly 59 and the supporting structure 57.

Similarly, in the arrangement shown in FIG. 5, the resilient bearing insert assembly 81 is so constructed that the amount of relative movement between interacting bearing element members is limited to that necessary to allow for differential expansion and with movement of the insert assembly with respect to the supporting structure also suitably restricted.

As shown, the insert assembly 81 comprises a first bearing element member 83 having a plurality of spaced-apart resilient surface elevations 65. Resilient surface elevations 65 are adapted to contact, support and interact with a second bearing element member 85 in the manner described in connection with the arrangement of FIG. 1. Member 85 has its ends bent back upon itself to form pockets 91 and 93 which receive the ends of member 83. A suitable restraining means, shown as a pin 95, may be provided in the supporting structure against which the ends of the insert assembly abut to restrict movement of such insert assembly within the supporting structure. The desired amount of relative movement between the two members is controlled by the size of the gaps provided between the terminating ends of the member 83 and the inside end of the respective pocket 91 or 93. Member 85 may have its ends bent back so as to meet each other to form a complete enclosing envelope to receive the member 83, if desired, rather than merely forming pockets. The additional radial thickness resulting from the folded-over ends of member 85 to form either the complete enclosing envelope or the pockets 91 and 93 may be readily provided for by suitable dimensioning of the bore in the supporting structure 79 into which the insert assembly 81 is disposed.

The two bearing element members in the embodiments just described in connection with FIGS. 4 and 5 interact with each other and with the hydrodynamic film forces in the same manner as has been fully described in connection with the embodiment shown in FIG. 1. Accordingly, the resilient surface elevations of the one member are adapted to contact and support the other member and cause such other member to locally deflect between adjacent resilient surface elevations during bearing operation and create load supporting hydrodynamic fluid films. Also, the resilient surface elevations may exhibit a stiffness at maximum steady-state design speed and loading which is less than twice the stiffness of the lubricant film in the region of smallest clearance between confronting bearing surfaces. The stiffness of the other member may be such that the maximum elastic deformation thereof between adjacent resilient surface elevations, in the direction normal to the confronting bearing surfaces, to the smallest clearance between confronting bearing surfaces is at least about 0.5.

As previously described, the resilient surface elevations may be of any suitable configuration and pattern which will allow for the required interaction between the two bearing element members under the influence of the hydrodynamic film forces so that the resilient surface elevations of the one member contact and support the other member and cause it to deflect locally between adjacent surface elevations an amount sufficient to create load supporting hydrodynamic fluid films.

In FIG. 1, the bearing element member 23 was shown with resilient surface elevations of a generally displaced cosine or circular arc configuration extending transversely across the bearing element member and spaced-apart longitudinally thereof. The other bearing element member 25 was shown as having a smooth surface. It is to be understood, however, that the resilient surface elevations may have other shapes, may be provided on both members and be in any suitable pattern which will allow for the required local deflection of the bearing element member between adjacent resilient surface elevations of the bearing element member with which it coacts to create the load supporting hydrodynamic fluid films.

Figure 6:
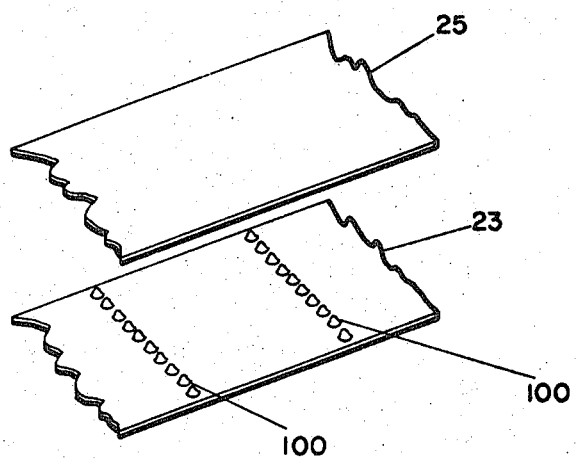
FIG. 6 is a diagrammatic exploded view of a portion of a resilient bearing insert assembly of this invention wherein the resilient surface elevations are spaced-apart both longitudinally and transversely of the bearing element member.

For example, the resilient surface elevations need not extend continuously entirely across the width of the member as illustrated in FIG. 1. Thus, two or more separate transverse resilient surface elevations may be provided across the width of the member so that the resilient surface elevations are spaced-apart both transversely and longitudinally. Another suitable arrangement wherein the resilient surface elevations are spaced-apart both transversely and longitudinally is illustrated in FIG. 6 wherein bearing element member 23 is shown as having a plurality of longitudinally spaced-apart transverse rows, each of which includes a plurality of separate spaced-apart resilient surface elevations 100.

Figure 7:
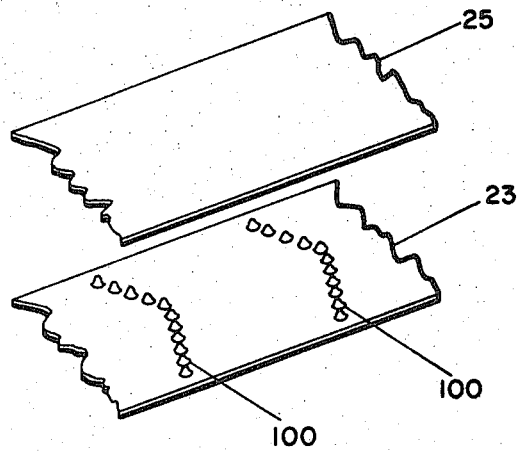
FIG. 7 is a similar diagrammatic exploded view of a portion of a resilient bearing insert assembly of this invention wherein the spaced-apart resilient surface elevations are arranged in an angular pattern.

Still another arrangement is shown in FIG. 7 wherein the resilient surface elevations are arranged in longitudinally spaced-apart angular rows which converge in the direction of relative circumferential lubricant motion. In such an arrangement, the interaction between the two members 23 and 25 under the influence of the hydrodynamic fluid film forces causes the member 25 to locally deflect between adjacent angular rows of resilient surface elevations in a generally angular or herringbone circumferential array. This angular array causes lubricant to be guided inwards during bearing operation towards the circumferential centerline as a result of which the side leakage from the bearing is reduced and the load capacity is increased. While such a surface pattern thus improves the load capacity of the bearing for a particular direction of relative motion between the confronting bearing surfaces, the load capacity may be reduced when the direction of motion is reversed. Bearings with such surface patterns are therefore generally unidirectional.

For certain applications where the starting torque required to overcome the normal preload exerted on the shaft by the resilient bearing insert assembly may be objectionable, any conventional friction-reducing techniques may be employed to reduce the starting torque requirement. For example, the confronting bearing surfaces may be provided with a coating of a suitable solid lubricant such as Molybdenum Disulphide. Alternatively, fluid lubricant may be injected between the confronting bearing surfaces. In an air lubricated bearing constructed in accordance with this invention, for example, a small quantity of water was injected between the confronting bearing surfaces for start-up. The water rapidly evaporated and the bearing continued operation with air lubrication.

Figure 8:
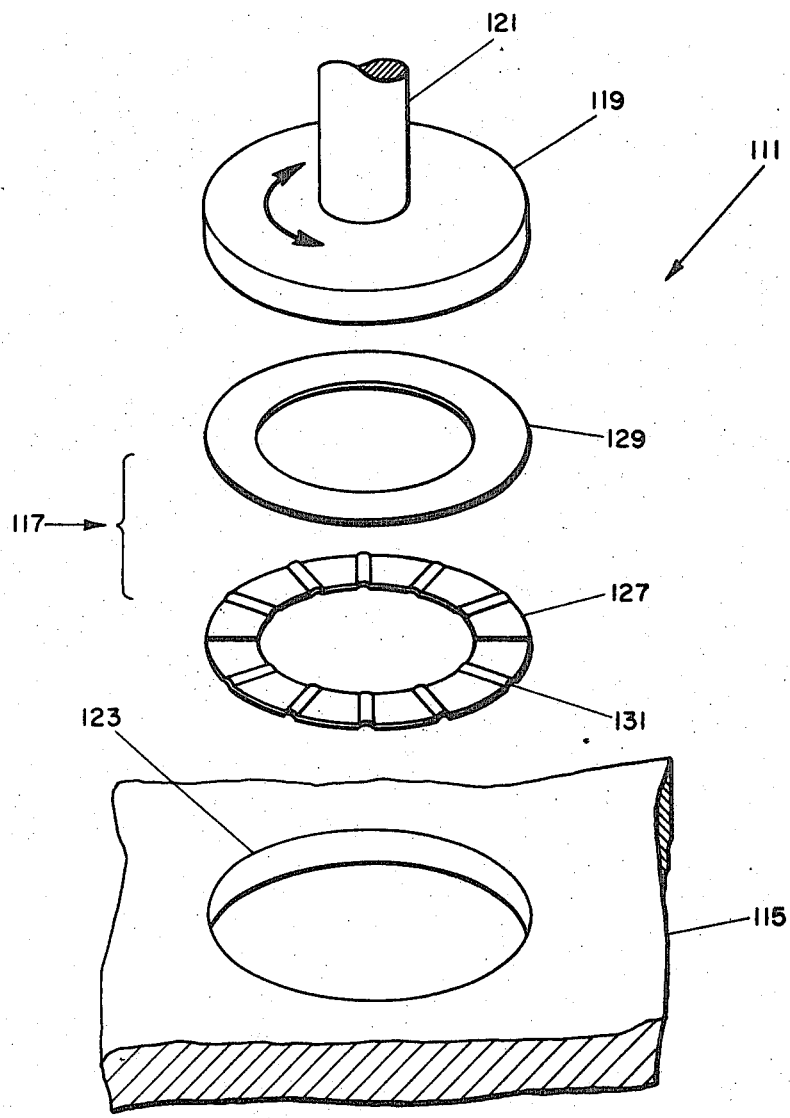
FIG. 8 is a diagrammatic exploded partial section view of a hydrodynamic resilient thrust bearing in accordance with this invention.

Referring now to FIG. 8 there is shown a hydrodynamic thrust bearing in accordance with this invention. The thrust bearing, generally designated as 111, is shown in exploded view and in vertical disposition. The bearing shown comprises a relatively movable member 119, shown as a thrust runner supporting a shaft 121, a supporting structure 115 provided with a thrust pocket 123, and, a resilient bearing insert assembly 117 including the disc shaped bearing element members 127 and 129.

As shown, the resilient bearing insert assembly 117 comprises a first disc 127 and a second disc 129 disposed in top-to-bottom juxtaposition so as to be in coacting relationship with each other. Disc member 127 is provided with a plurality of spaced-apart resilient surface elevations 131, shown as radial raised shapes. The second disc member 129 contacts, is supported by and interacts with the resilient surface elevations 131 of the disc member 127. The two members 127 and 129 are arranged in a unitary assembly adapted to limit relative movement between them. The insert 117 is adapted to fit into the thrust pocket 123 and presents on the smooth obverse side of the second member a confronting bearing surface 137 to support the thrust runner 119. Rotational movement of insert assembly 117 within the thrust pocket 123 may be prevented by suitably fastening the first member 127 to the surface of the thrust pocket. For example, member 127 may be spot welded to the surface of the thrust pocket 123. Thrust runner 119 may be rotated in either direction as shown by the arrow 139.

The foregoing thrust bearing operates in the same manner as described in connection with the arrangement of FIG. 1. Thus, the disc shaped bearing element members 127 and 129 interact during bearing operation so that the member 129 is in contact with and supported by the resilient surface elevations 131 which, under the influence of the hydrodynamic film forces, causes member 129 to be locally deflected between adjacent resilient surface elevations an amount sufficient to create load supporting hydrodynamic fluid films.

Figure 9:
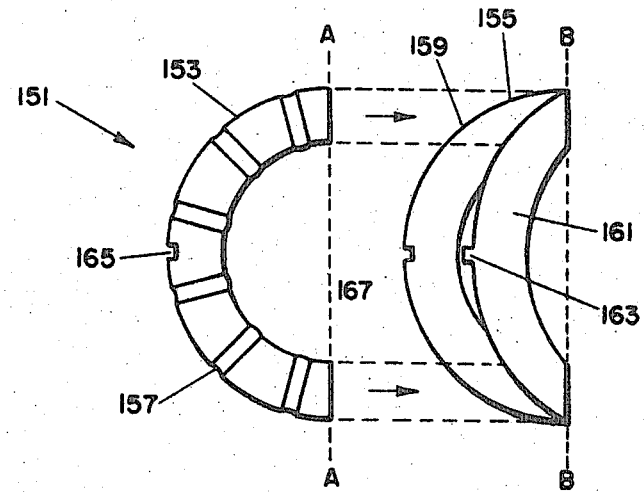
FIG. 9 is a diagrammatic view of a part of an alternative resilient bearing insert assembly suitable for use with the thrust bearing illustrated in FIG. 8; and, FIG. 10 is a diagrammatic exploded partial section view of conical hydrodynamic bearing in accordance with this invention.

Referring now to FIG. 9, there is shown in exploded view, one half of a resilient thrust bearing insert assembly in accordance with another embodiment of this invention and suitable for use with a thrust bearing such as that of FIG. 8. Two such semicircular assemblies placed side by side are needed for one complete thrust bearing. Each semicircular resilient bearing insert assembly, designated 151, comprises a first member 153 and a second member 155. Member 153, shown as a half ring to the left of its diameter A—A, is provided with a plurality of resilient surface elevations 157. Member 155 is adapted to be folded at its polar diameter B—B to form a pocket to receive the first member 153 which is inserted into the pocket defined by the two halves 159 and 161 of the second member 155. Bearing element members 153 and 155 may be arranged as a unitary assembly by providing suitable fastening means for pocket 153 so that the member 153 will be retained within the pocket. Conveniently, the two halves 159 and 161 may be held together by the small tab 163, provided at one of the equatorial edges of the member 155 so as to retain member 153. For example, when tab 163 is folded over to engage in cutouts 165 and 167 in the first member and second member respectively, the pocket defined by the two halves 159 and 161 is held closed and member 153 is suitably retained therein. Any other suitable means may be employed to secure members 153 and 155 together.

Two of the foregoing described semicircular resilient insert portions 151 are fit into the thrust pocket of a supporting structure so that they are in butting relationship to each other at their diameter B—B, and so that the second member 155 is supported by the resilient surface elevations 157 of the first member 153. In operation member 155 is caused to deflect between adjacent resilient surface elevations an amount sufficient to create load supporting hydrodynamic fluid films in the manner already described. Rotational movement of the two semicircular assemblies 151 in the thrust pocket is prevented by any suitable means, such as for example by spot welding the reverse side of the member 155 to the surface of the thrust pocket.

Figure 10:
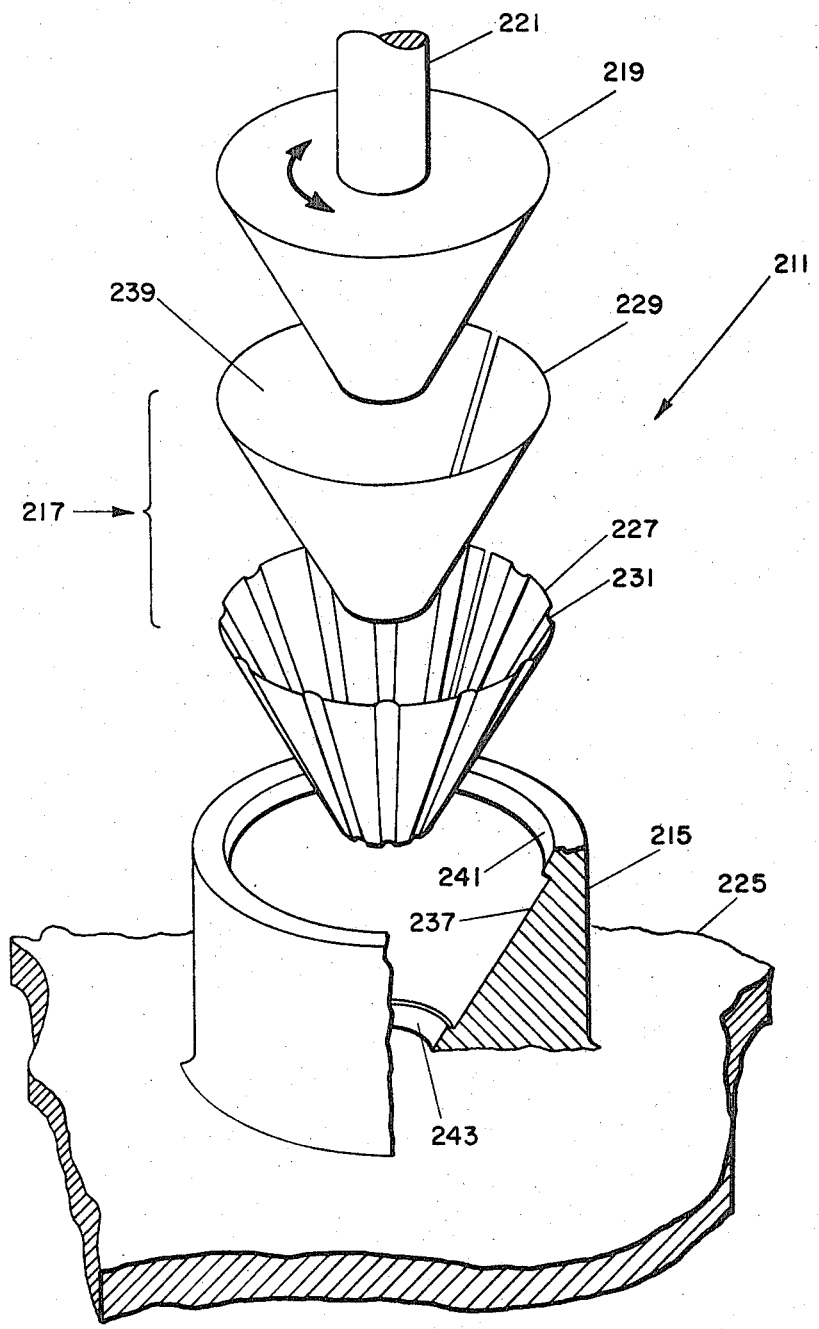

Referring now to FIG. 10 there is shown a hydrodynamic conical bearing in accordance with this invention. The conical bearing, generally designated as 211, is shown in exploded view, in vertical disposition, and comprises a relatively movable member 219, shown as thrust runner supporting a shaft 221. The conical bearing also includes a resilient bearing insert assembly 217 adapted to fit within a supporting structure 215.

As shown, the resilient bearing insert assembly 217 comprises a first conical shaped bearing element member 227 and a second conically shaped bearing element member 229 disposed in contiguous coacting relationship. Member 227 is provided with a plurality of spaced-apart resilient surface elevations 231.

In a conical bearing of this type member 227 should be provided with at least three resilient surface elevations. The members 227 and 229 are arranged so that the resilient surface elevations of the member 227 contact and support the second member 229 in the manner previously described. The two members may be united by suitable means at one location to limit relative movement between them. The insert assembly 217 is adapted to fit into the conical bore 237 of the supporting structure 215 and presents a confronting bearing surface 239 to support the thrust runner 219.

Outward movement of insert 217 from the conical bore 237 is prevented by shoulders 241 and 243. Rotational movement of insert 217 is prevented, for example, by spot welding the first member 227 to the surface of the conical bore. Alternatively, movement between the two members 227 and 229, as well as between the insert assembly and the supporting structure, may be limited by employing one of the arrangements illustrated in FIG. 4 or 5.

Although there has been described herein what is considered at present to be preferred embodiments of the invention, many modifications and changes may occur to those skilled in the art. Therefore, it is intended that the appended claims cover all such modifications and changes as fall within the true spirit and scope of the invention.

What we claim as new and desire to secure by Letters Patent of the United States is:

1. A resilient hydrodynamic fluid film bearing comprising:
   a. First and second members movable relative to one another and disposed to form a spacing between the confronting surfaces thereof;
   b. A resilient bearing insert assembly positioned within said spacing between said relatively movable members,
      said insert assembly comprising a first bearing element member presenting a surface area to said first relatively movable member and disposed in laminate relationship with a second bearing element member which exhibits a plurality of spaced-apart resilient surface elevations of predetermined configuration and pattern;

c. Means anchoring said first and second bearing element members together in said laminate relationship to allow for a limited amount of relative sliding movement between said bearing element members so that under dynamic conditions said resilient surface elevations are operative to effect a sliding frictional contact and resilient support for the first bearing element member; and d. Means anchoring said resilient bearing insert assembly to said second relatively movable member to allow for a limited amount of relative sliding movement between said insert assembly and the confronting surface of said second relatively movable member so that during operation of said bearing said first bearing element member coacts with said first relatively movable member and also with the resilient surface elevations of said second bearing element member operative to cause sufficient local deflections of said first bearing element member between adjacent resilient surface elevations to cause the creation of load supporting hydrodynamic fluid films.

2. The resilient hydrodynamic fluid film bearing recited in claim 1 wherein one of said bearing element members is continuous.

3. The resilient hydrodynamic fluid film bearing recited in claim 1 wherein each of said bearing element members is continuous.

4. The resilient hydrodynamic fluid film bearing recited in claim 1 wherein said second bearing element is continuous.

5. The resilient hydrodynamic fluid film bearing recited in claim 1 wherein said means for anchoring to allow a limited amount of relative movement between said first and second bearing element members comprises means for joining said bearing element members together at a single location near an end.

6. The resilient hydrodynamic fluid film bearing recited in claim 1 wherein said means for anchoring to allow a limited amount of relative movement between said first and second bearing element members comprises means for joining said bearing element members together at a single location near the center.

7. The resilient hydrodynamic fluid film bearing recited in claim 1 wherein said means for anchoring to allow a limited amount of relative movement between said first and second bearing element members comprises retaining means integral with one of said bearing element members.

8. The resilient hydrodynamic fluid film bearing recited in claim 7 wherein said retaining means includes outwardly extending portions on said one bearing element member adapted to retain said other bearing element member between it and one of said relatively movable members.

9. The resilient hydrodynamic fluid film bearing recited in claim 7 wherein said retaining means includes pocket means defined by opposed surfaces of one bearing element member and adapted to receive and restrict movement of said other bearing element member.

10. The resilient hydrodynamic fluid film bearing recited in claim 1 wherein said resilient surface elevations are in the form of raised shapes extending transversely of said second bearing element member.

11. The resilient hydrodynamic fluid film bearing recited in claim 1 wherein said resilient surface elevations are in the form of raised shapes spaced-apart both transversely and longitudinally.

12. The resilient hydrodynamic fluid film bearing recited in claim 1 wherein said second bearing element member exhibits a plurality of longitudinally spaced-apart rows of resilient surface elevations each of which rows comprising a plurality of separate spaced-apart resilient surface elevations.

13. The resilient hydrodynamic fluid film bearing recited in claim 12 wherein said rows are disposed angularly across said second bearing element member and the angle converges in the direction of relative fluid motion.

14. The resilient hydrodynamic fluid film bearing recited in claim 1 wherein the resilient surface elevations of said second bearing element member exhibit a stiffness during bearing operation at maximum steady-state design speed and loading which is less than twice the stiffness of the load supporting fluid film in the region of smallest clearance between said relatively movable members and the stiffness of the first bearing element member is such that the ratio of its maximum elastic deformation between adjacent resilient surface elevations in the direction normal to the confronting surfaces of the relatively movable members to the smallest clearance therebetween is at least above 0.5.

15. The resilient hydrodynamic fluid film bearing recited in claim 14 wherein the thickness of said first and second bearing element members is in the range of about 0.001 to 0.005 inches.

16. The resilient hydrodynamic fluid film bearing recited in claim 15 wherein the vertical height of said resilient surface elevations is in the range of about 0.001 to 0.030 inches.

17. The resilient hydrodynamic fluid film bearing recited in claim 14 wherein the vertical height of said resilient surface elevations is greater than the ratio of maximum load on said resilient surface elevations to the stiffness of said elevation.

18. A resilient hydrodynamic fluid film bearing comprising:

a. First and second members movable relative to one another and disposed to form a spacing between the confronting surfaces thereof;

b. A resilient bearing insert assembly disposed within said spacing presenting a surface area to one of said relatively movable members and anchored to the other relatively movable member to allow a limited amount of relative sliding movement therebetween, said insert assembly including first and second bearing element members arranged in laminate relationship and anchored together to allow a limited amount of relative sliding movement therebetween, said first bearing element member including a plurality of longitudinally spaced-apart resilient surface elevations which frictionally contact and resiliently support the second bearing element member during bearing operation and cause said second bearing element member to deflect between adjacent resilient surface elevations an amount sufficient to create load supporting hydrodynamic fluid films, said resilient surface elevations of said first bearing element member being made to exhibit a stiffness during bearing operation at maximum steady-state design speed and loading which is less than twice the stiffness of the load supporting fluid film in the region of smallest clearance between confronting bearing surfaces defined by said relatively movable members and said resilient bearing insert assembly and said second bearing element member being made to exhibit a stiffness such that the ratio of its maximum elastic deformation between adjacent resilient surface elevations in the direction normal to said confronting bearing surfaces to the smallest clearance therebetween is at least above 0.5.

19. The resilient hydrodynamic fluid film bearing recited in claim 18 wherein said bearing is of the journal type the first member is a housing having an opening, the second member is a rotatable shaft received within said opening and said resilient bearing insert assembly extends about substantially the entire circumference of said shaft and is anchored to said housing.

20. The resilient hydrodynamic fluid film bearing recited in claim 19 wherein said resilient surface elevations extend angularly across said first bearing element member and said angle converges in the direction of relative circumferential fluid motion.

21. The resilient hydrodynamic fluid film bearing recited in claim 18 wherein said resilient surface elevations are in the form of raised shapes extending transversely of said first bearing element member.

22. The resilient hydrodynamic bearing recited in claim 18 wherein said first member is a supporting structure and said second member is a rotatable shaft having a thrust element affixed thereto and said resilient bearing insert assembly is disposed in thrust load supporting relationship between said thrust element and said supporting structure and anchored to said supporting structure.

23. The resilient hydrodynamic bearing recited in claim 18 wherein said first member is a supporting structure and said second member is a rotatable shaft having a conical element affixed thereto and said resilient bearing insert assembly is disposed in load supporting relationship between said conical element and said supporting structure and anchored to said supporting structure.

* * * * *